(12) United States Patent
Shien (10) Patent No.: US 7,448,403 B2
(45) Date of Patent: Nov. 11, 2008

(54) FAUCET CO-OPERATING WITH SHOWER HEAD

(75) Inventor: Ming-Dang Shien, Lu Kang (TW)

(73) Assignee: Horng Lai Industrial Co., Ltd., Changhua Hsien (TW)

( * ) Notice: Subject to any disclaimer, the term of this patent is extended or adjusted under 35 U.S.C. 154(b) by 584 days.

(21) Appl. No.: 11/183,618

(22) Filed: Jul. 18, 2005

(65) Prior Publication Data

US 2007/0012361 A1    Jan. 18, 2007

(51) Int. Cl.
*F16K 11/10* (2006.01)
(52) U.S. Cl. .............................. 137/119.05; 137/119.04; 137/467; 4/568; 4/615
(58) Field of Classification Search ............ 137/119.05, 137/119.03, 119.04, 597, 467, 801; 239/443–447, 239/562, 565, 581.1; 4/567, 568, 570, 615, 4/676; 251/205, 208
See application file for complete search history.

(56) References Cited

U.S. PATENT DOCUMENTS

| | | | | |
|---|---|---|---|---|
| 3,297,046 A | * | 1/1967 | Hall | 137/119.05 |
| 4,706,709 A | * | 11/1987 | Monch | 137/597 |
| 6,279,605 B1 | * | 8/2001 | Wang | 137/454.6 |
| 6,561,210 B2 | * | 5/2003 | Hsieh et al. | 137/119.04 |

* cited by examiner

*Primary Examiner*—Gregory L Huson
*Assistant Examiner*—Craig M Schneider
(74) *Attorney, Agent, or Firm*—Alan Kamrath; Kamrath & Associates PA (57) ABSTRACT

A faucet includes a faucet body, and a switching device including a switching valve mounted on the water outlet pipe of the faucet body, and a control valve adjustably mounted on the switching valve and connected to a shower head. Thus, the valve seat of the control valve is rotated to change and control the water outlet modes of the faucet exactly, thereby enhancing the switching function and working efficiency of the faucet. In addition, the faucet body only needs to provide a single screw bore for mounting the switching device without having to provide two screw bores which have to align with each other, thereby facilitating fabrication of the faucet, and thereby decreasing the costs of fabrication.

19 Claims, 9 Drawing Sheets

FAUCET CO-OPERATING WITH SHOWER HEAD

BACKGROUND OF THE INVENTION

1. Field of the Invention

The present invention relates to a faucet, and more particularly to a faucet having a switching device connected to a shower head so that the faucet co-operates with the shower head.

2. Description of the Related Art

Figure 8:
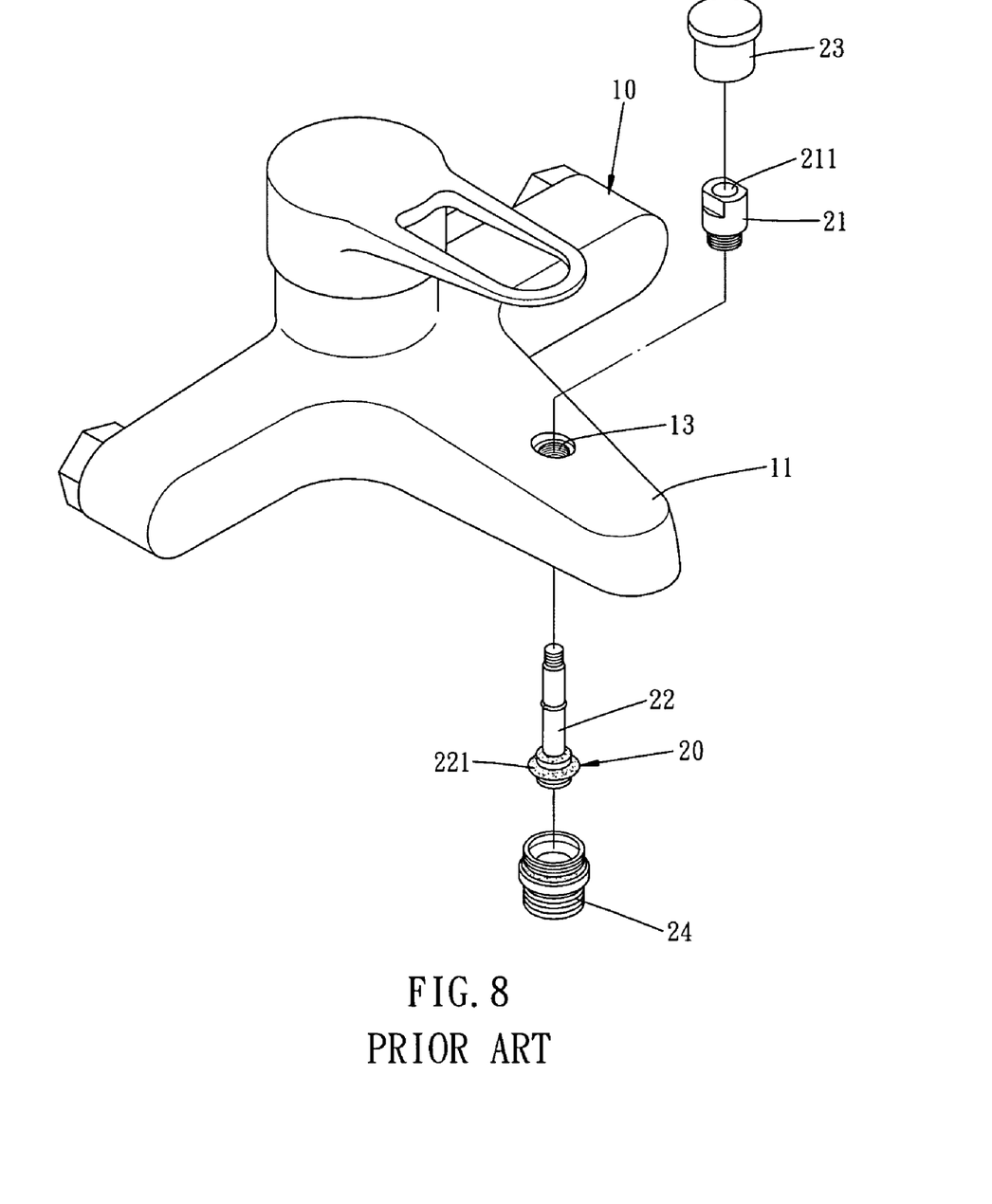
FIG. 8 is an exploded perspective view of a conventional faucet in accordance with the prior art.
Figure 9:
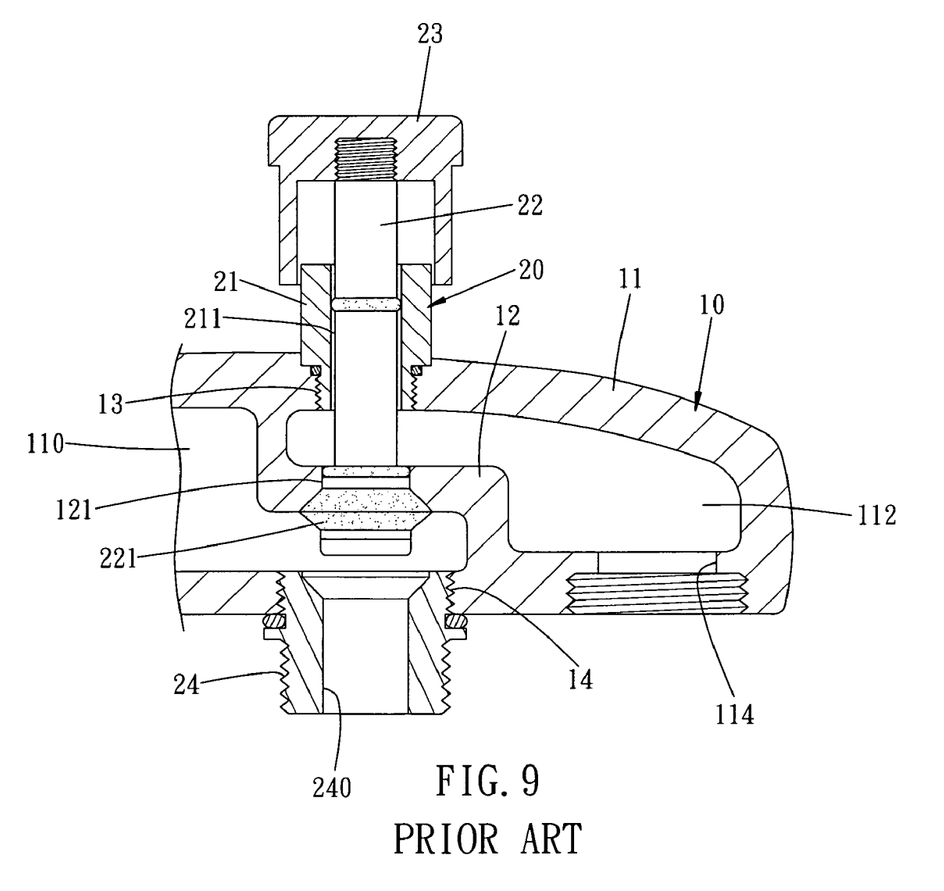
FIG. 9 is a partially plan cross-sectional assembly view of the faucet as shown in FIG. 1.

A conventional faucet in accordance with the prior art shown in FIGS. 8 and 9 comprises a faucet body 10 having a water outlet pipe 11, and a switching device 20 mounted on the water outlet pipe 11 of the faucet body 10. The water outlet pipe 11 of the faucet body 10 has an inside provided with a baffle 12 to divide the inside of the water outlet pipe 11 into a first water channel 110 and a second water channel 112. The second water channel 112 has a spout 114. The baffle 12 has a conduit 121 communicating with the first water channel 110 and the second water channel 112. The water outlet pipe 111 of the faucet body 10 has a top formed with an upper screw bore 13 aligned with the conduit 121 of the baffle 12 and connected to the ambient environment, and a bottom formed with a lower screw bore 14 aligned with the conduit 121 of the baffle 12 and connected to the ambient environment. The switching device 20 includes a threaded connector 24 screwed into the lower screw bore 14 of the faucet body 10 for mounting a hose (not shown) of a shower head (not shown) and having an inside formed with a water outlet hole 240, a support seat 21 having a lower end screwed into the upper screw bore 13 of the faucet body 10 and an inside formed with a shaft hole 211, a shaft 22 movably mounted in the shaft hole 211 of the support seat 21 and having an upper end protruded from the support seat 21 and a lower end extended through the conduit 121 of the baffle 12 and provided with a sealing gasket 221, and a control handle 23 movably mounted on the support seat 21 and screwed onto the upper end of the shaft 22 to move the shaft 22.

When the shaft 22 is moved upward by the control handle 23, the sealing gasket 221 is moved upward to seal the conduit 121 of the baffle 12, so that the water from the faucet body 10 flows through the water outlet hole 240 of the threaded connector 24 into the hose of the shower head. Alternatively, when the shaft 22 is moved downward by the control handle 23, the sealing gasket 221 is moved downward to open the conduit 121 of the baffle 12 and to seal the water outlet hole 240 of the threaded connector 24, so that the water from the faucet body 10 flows through the conduit 121 of the baffle 12 into the second water channel 112 and flows outward from the spout 114.

However, when the shaft 22 is lifted, the shaft 22 is easily lowered down by the total weight of the shaft 22 and the control handle 23, thereby causing inconvenience to the user. In addition, the faucet body 10 has to provide an upper screw bore 13 and a lower screw bore 14 aligned with each other, thereby increasing the costs of fabrication. Further, the user has to drive the control handle 23 to overcome the friction between the shaft 22 and the support seat 21, thereby wasting the manual work.

SUMMARY OF THE INVENTION

The primary objective of the present invention is to provide a faucet having an exact positioning effect.

Another objective of the present invention is to provide a faucet, wherein the valve seat of the control valve is rotated to change and control the water outlet modes of the faucet exactly, thereby enhancing the switching function and working efficiency of the faucet.

A further objective of the present invention is to provide a faucet, wherein the faucet body only needs to provide a single screw bore for mounting the switching device without having to provide two screw bores which have to align with each other, thereby facilitating fabrication of the faucet, and thereby decreasing the costs of fabrication.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a faucet in accordance with the preferred embodiment of the present invention comprises a faucet body 30 having a water outlet pipe 31, and a switching device 4 mounted on the water outlet pipe 31 of the faucet body 30.

The water outlet pipe 31 of the faucet body 30 has an inside provided with a baffle 32 to divide the inside of the water outlet pipe 31 into a first water channel 310 and a second water channel 312. The baffle 32 has a conduit 321 communicating with the first water channel 310 and the second water channel 312. The first water channel 310 of the faucet body 30 has a screw bore 311 aligned with the conduit 321 of the baffle 32 and connected to the ambient environment, and the second water channel 312 of the faucet body 30 has a spout 314 connected to the ambient environment. The conduit 321 of the baffle 32 has a periphery formed with a mounting recess 322 for mounting a washer 46.

The switching device 4 includes a switching valve 40 mounted on the water outlet pipe 31 of the faucet body 30, and a control valve 50 adjustably mounted on the switching valve 40 and connected to a shower head 60. The control valve 50 is operable between a first position where the control valve 50 is opened, so that the water from the water outlet pipe 31 of the faucet body 30 flows through the switching valve 40 and the control valve 50 into the shower head 60 and a second position where the control valve 50 is closed, so that the water from the water outlet pipe 31 of the faucet body 30 flows through the switching valve 40 and the conduit 321 of the baffle 32 into the spout 314.

The switching valve 40 includes a sleeve 41, a support seat 42, a valve shaft 43, a push member 45, and an elastic member 44.

The sleeve 41 of the switching valve 40 is mounted in the water outlet pipe 31 of the faucet body 30 and has a periphery formed with a plurality of water inlet holes 411 communicating with the first water channel 310 of the water outlet pipe 31. The sleeve 41 has an upper end rested on the washer 46 in the conduit 321 of the baffle 32. The sleeve 41 has a lower end formed with an outer thread 413 screwed into the screw bore 311 of the faucet body 30 and a rotation portion 412 located under the outer thread 413 protruded outward from the water outlet pipe 31 of the faucet body 30. The sleeve 41 has an inner wall having an upper portion formed with a stepped groove 414 and a lower portion formed with an inner thread 415.

The support seat 42 of the switching valve 40 is secured in the sleeve 41 and has a periphery formed with a plurality of passages 422 communicating with the water inlet holes 411 of the sleeve 41. The support seat 42 has an upper end formed with a stepped guide hole 424 communicating with the passages 422 and the conduit 321 of the baffle 32. The upper end of the support seat 42 is mounted in the stepped groove 414 of the sleeve 41 and rested on the washer 46 in the conduit 321 of the baffle 32. The support seat 42 has a stepped outer wall provided with two O-rings 421 and 423 rested on the inner wall of the sleeve 41.

The valve shaft 43 of the switching valve 40 is movably mounted in the support seat 42 and has an upper end provided with a tapered sealing member 432 that is movable between a first position where the sealing member 432 opens the guide hole 424 of the support seat 42, so that the guide hole 424 of the support seat 42 is connected to the passages 422 of the support seat 42 and a second position where the sealing member 432 seals the guide hole 424 of the support seat 42 to interrupt the connection between the guide hole 424 of the support seat 42 and the passages 422 of the support seat 42. The upper end of the valve shaft 43 has an enlarged head 431 rested on the sealing member 432.

The push member 45 of the switching valve 40 is a conical body made of rubber. The push member 45 is secured to a lower end of the valve shaft 43 to drive the valve shaft 43 to move downward. The push member 45 is protruded outward from the support seat 42 and movable in the sleeve 41.

The elastic member 44 of the switching valve 40 is mounted on the valve shaft 43 and biased between the valve shaft 43 and the support seat 42 to provide a restoring force to the valve shaft 43 to push the sealing member 432 to open the guide hole 424 of the support seat 42.

The control valve 50 includes a control shaft 52, a valve seat 51, a valve block 53, a control block 54, and a tap 55.

The control shaft 52 of the control valve 50 is secured to the sleeve 41 of the switching valve 40 and has an inside formed with a water outlet conduit 521 communicating with the sleeve 41. The control shaft 52 has a lower end formed with an enlarged catch portion 522. The catch portion 522 of the control shaft 52 has a bottom face formed with two opposite protruding locking blocks 523. The control shaft 52 has an upper end formed with an outer thread 524 screwed into the inner thread 415 of the sleeve 41.

The valve seat 51 of the control valve 50 is rotatably mounted on the control shaft 52 and has a periphery provided with two opposite protruding control handles 511 to facilitate rotation of the valve seat 51. The valve seat 51 has a lower end formed with a reduced outer thread 512. The valve seat 51 has an inner wall having a lower end formed with two opposite positioning grooves 514 and an inner thread 513. The shower head 60 has a hose 62 having a threaded connector 64 screwed onto the outer thread 512 of the valve seat 51, so that the valve seat 51 is connected to the shower head 60 by the hose 62.

The valve block 53 of the control valve 50 is secured to the control shaft 52 and received in the valve seat 51. The valve block 53 has a periphery formed with two opposite openings 532 each communicating with the water outlet conduit 521 of the control shaft 52. The valve block 53 has a face formed with two opposite locking recesses 531 to lock the locking blocks 523 of the control shaft 52 so that the valve block 53 is secured to the control shaft 52.

The control block 54 of the control valve 50 is secured in the valve seat 51 to rotate therewith and has a periphery formed with two opposite protruding positioning lips 541 secured in the positioning grooves 514 of the valve seat 51. The control block 54 is a circular body and has an inside formed with two opposite water outlet holes 542 that are movable to align with the openings 532 of the valve block 53. Thus, the control block 54 is movable between a first position where the water outlet holes 542 of the control block 54 are connected to the openings 532 of the valve block 53 and a second position where the openings 532 of the valve block 53 are sealed by a face of the control block 54 to interrupt the connection between the water outlet holes 542 of the control block 54 and the openings 532 of the valve block 53.

The tap 55 of the control valve 50 is secured in the valve seat 51 and rested on the control block 54 to retain the control block 54 in the valve seat 51. The tap 55 has an outer thread 550 screwed into the inner thread 513 of the valve seat 51.

The tap 55 has an end face provided with an O-ring 551 rested on the control block 54 and a periphery provided with an O-ring 552 rested on the valve seat 51.

Figure 1:
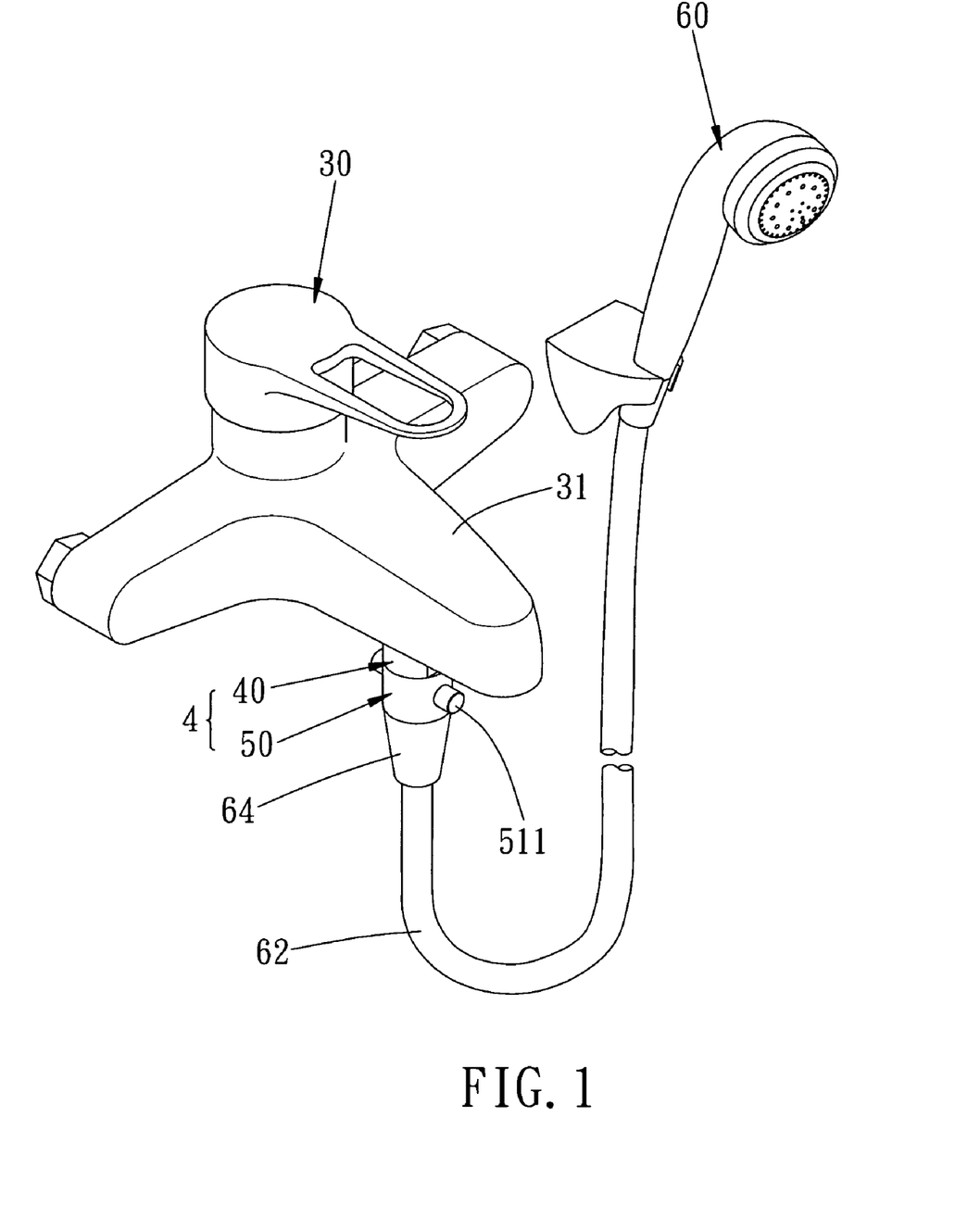
FIG. 1 is a perspective view of a faucet in accordance with the preferred embodiment of the present invention.
Figure 2:
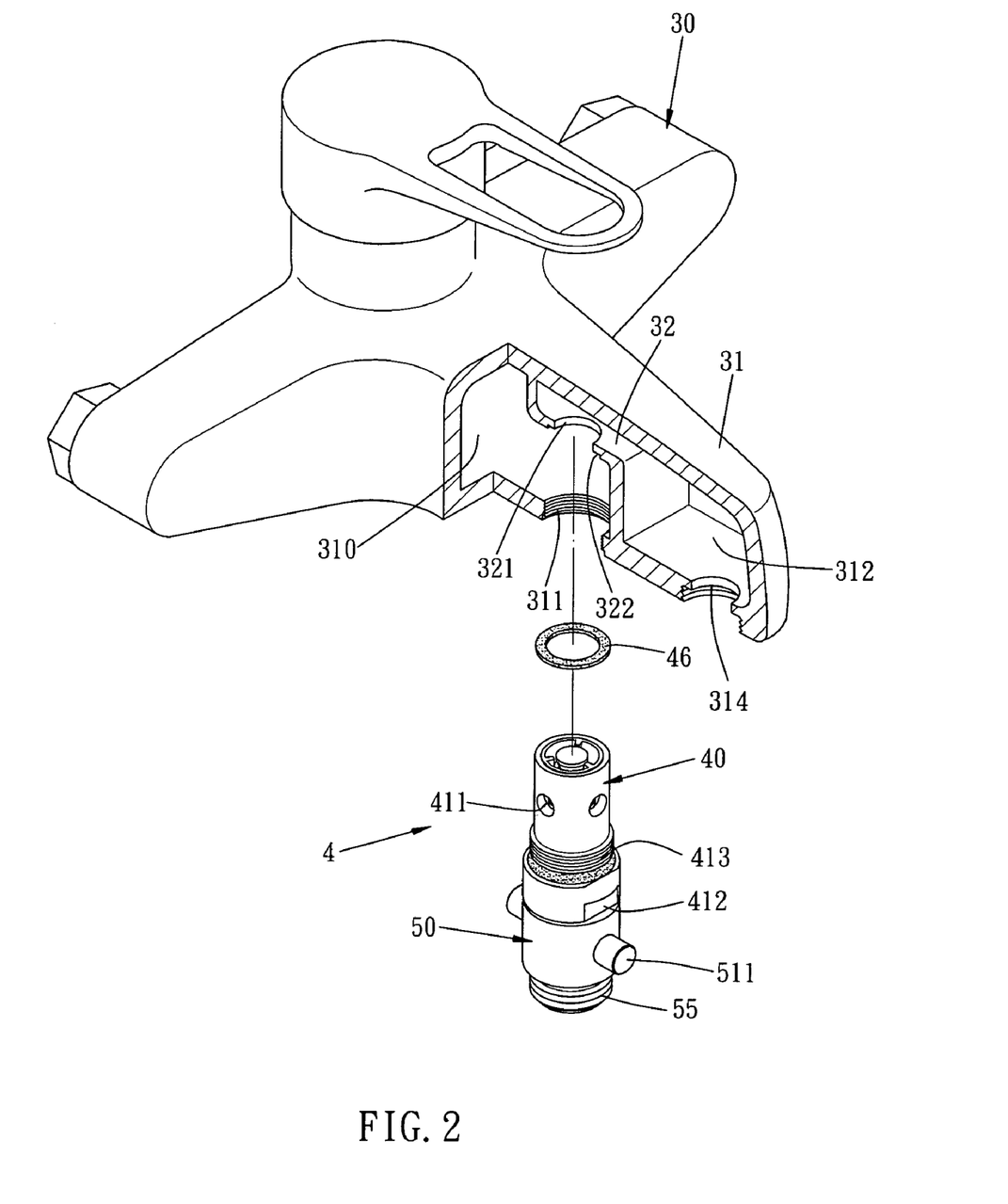
FIG. 2 is a partially exploded perspective cross-sectional view of the faucet as shown in FIG. 1.
Figure 3:
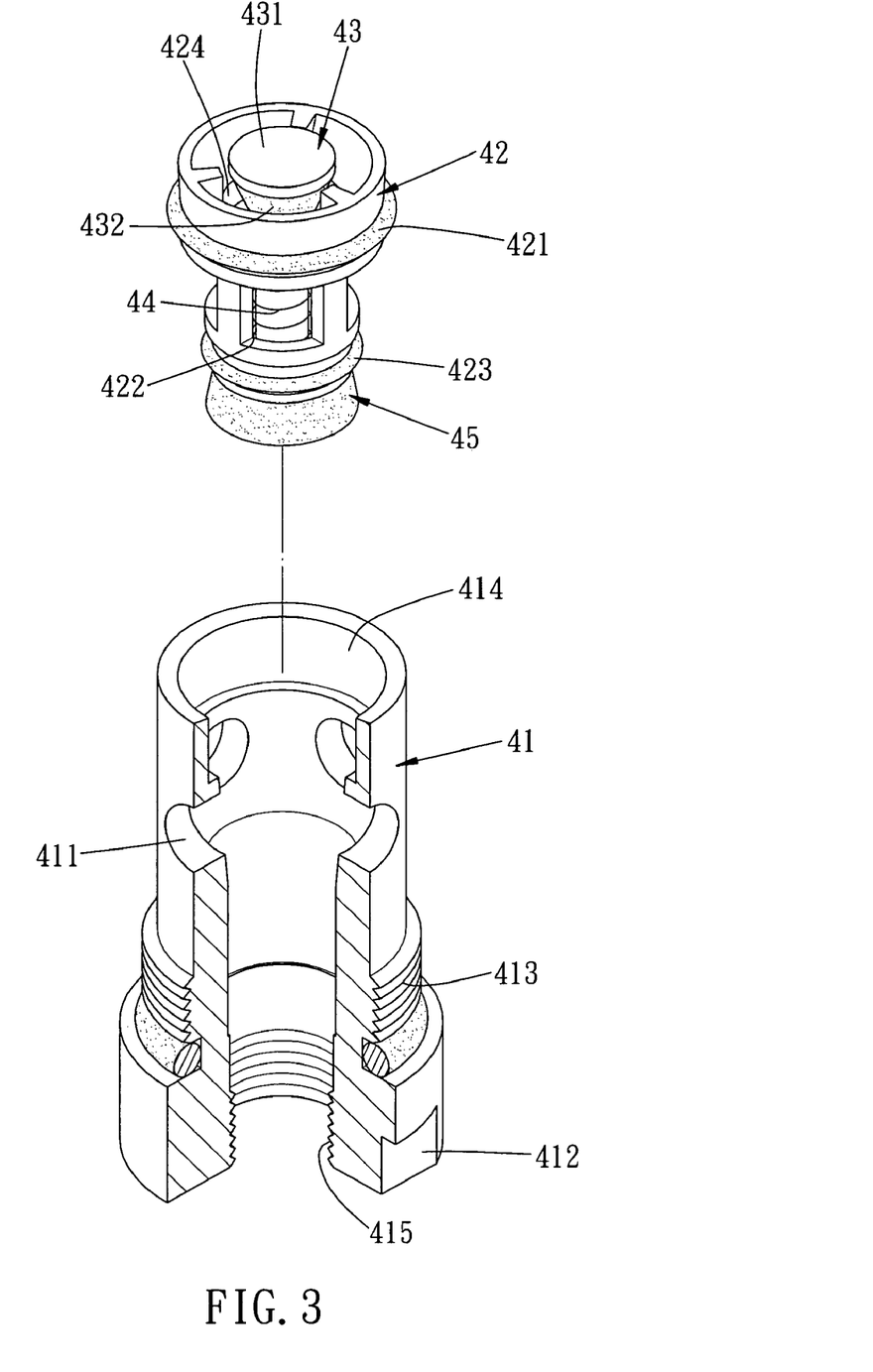
FIG. 3 is a partially exploded perspective cross-sectional view of the faucet as shown in FIG. 1.
Figure 4:
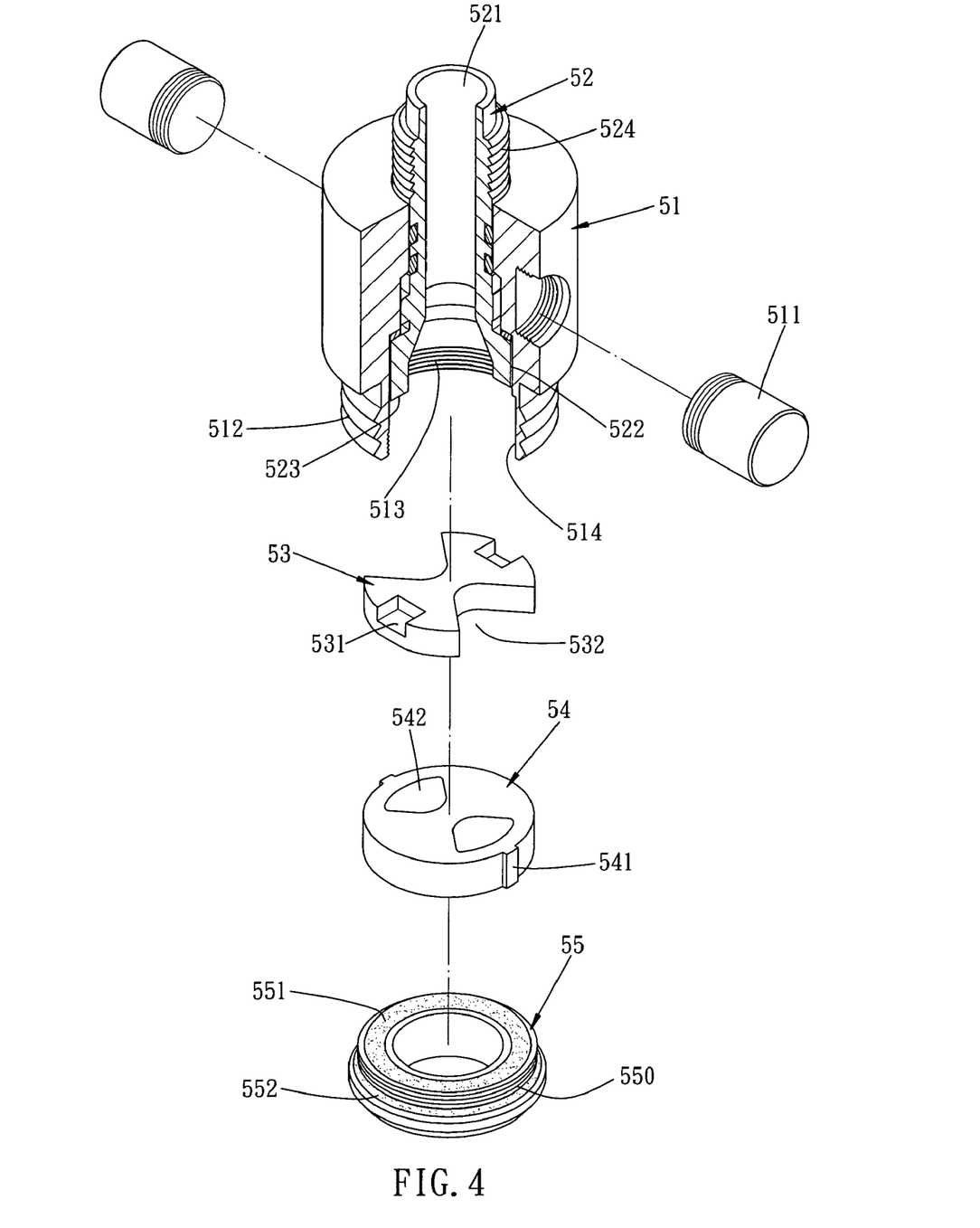
FIG. 4 is a partially exploded perspective cross-sectional view of the faucet as shown in FIG. 1.
Figure 5:
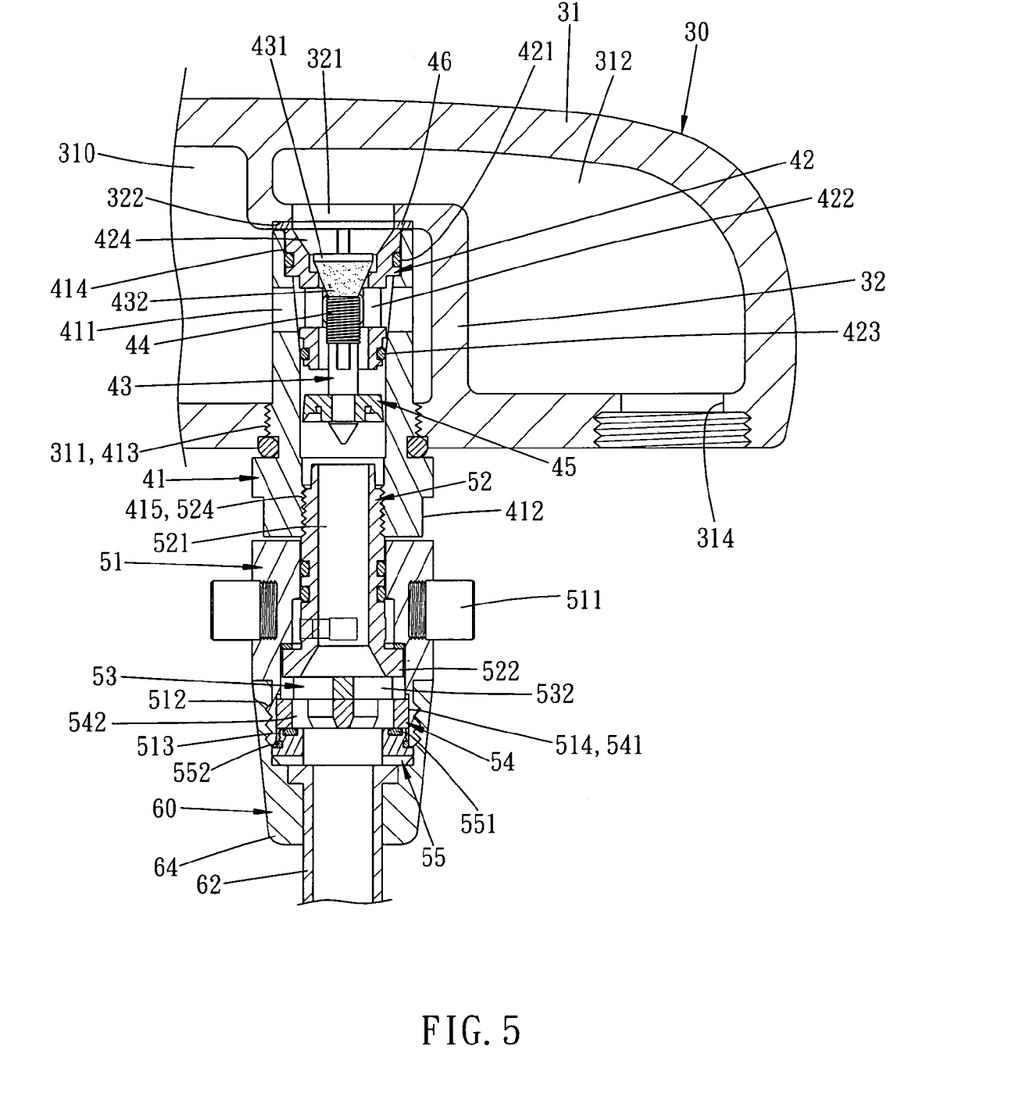
FIG. 5 is a partially plan cross-sectional view of the faucet as shown in FIG. 1.
Figure 6:
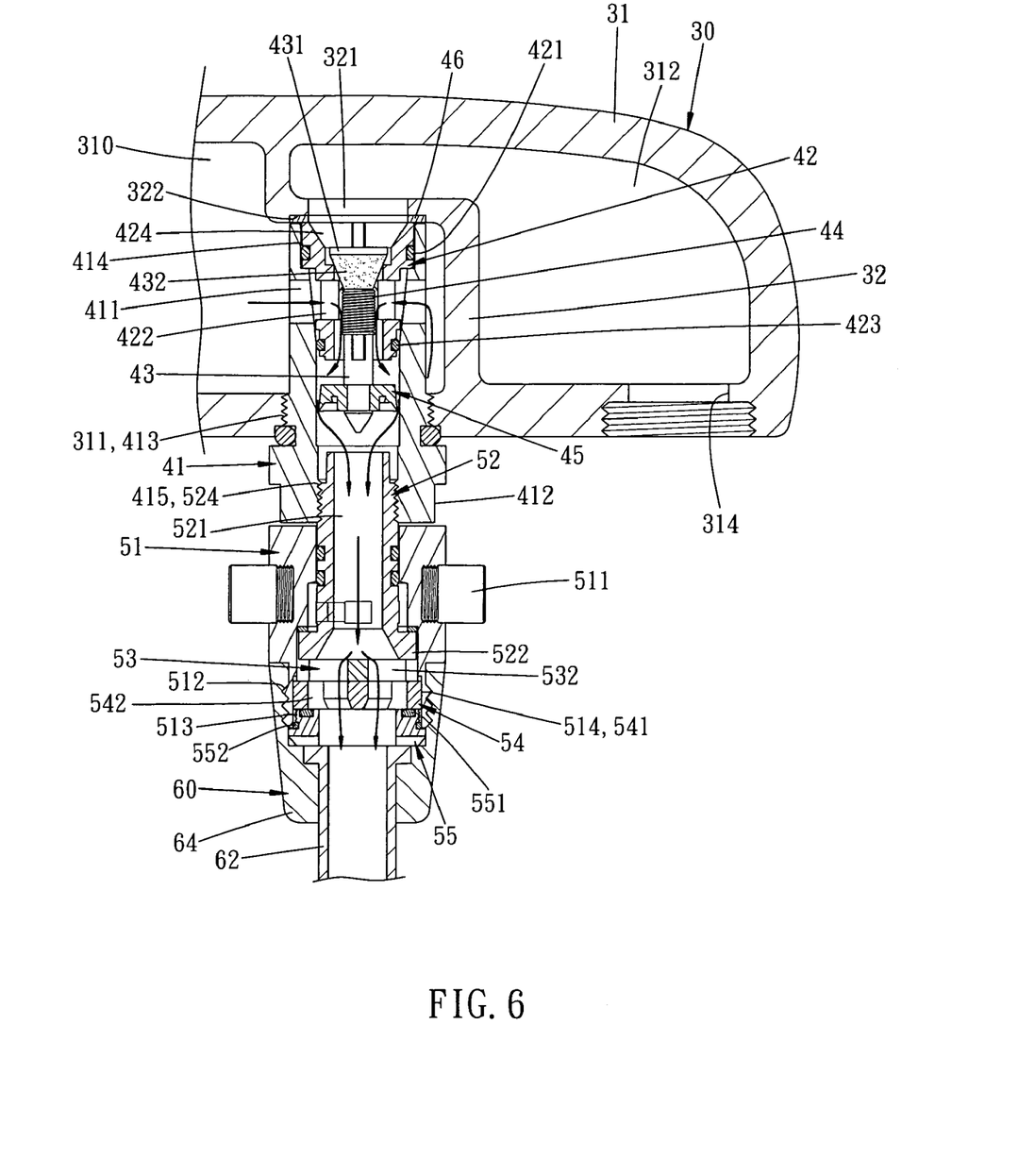
FIG. 6 is a schematic operational view of the faucet as shown in FIG. 5 in use.

Referring to FIG. 6 with reference to FIGS. 1-5, the valve seat 51 of the control valve 50 is rotated by the control handles 511 to rotate the control block 54 to the first position where the water outlet holes 542 of the control block 54 are connected to the openings 532 of the valve block 53. In such a manner, the water from the faucet body 30 flows through the water inlet holes 411 of the sleeve 41 and the passages 422 of the support seat 42 into the inside of the support seat 42 to push the push member 45 to drive the valve shaft 43 to move downward and to compress the elastic member 44 so that the sealing member 432 of the valve shaft 43 is moved downward to seal the guide hole 424 of the support seat 42 to interrupt the connection between the guide hole 424 of the support seat 42 and the passages 422 of the support seat 42, thereby preventing the water from flowing through the guide hole 424 of the support seat 42 into the conduit 321 of the baffle 32. Thus, the water from the faucet body 30 in turn flows through the water inlet holes 411 of the sleeve 41, the passages 422 of the support seat 42, the inside of the support seat 42, the gap between the push member 45 and the sleeve 41, the water outlet conduit 521 of the control shaft 52, the openings 532 of the valve block 53 and the water outlet holes 542 of the control block 54 into the hose 62 of the shower head 60.

Figure 7:
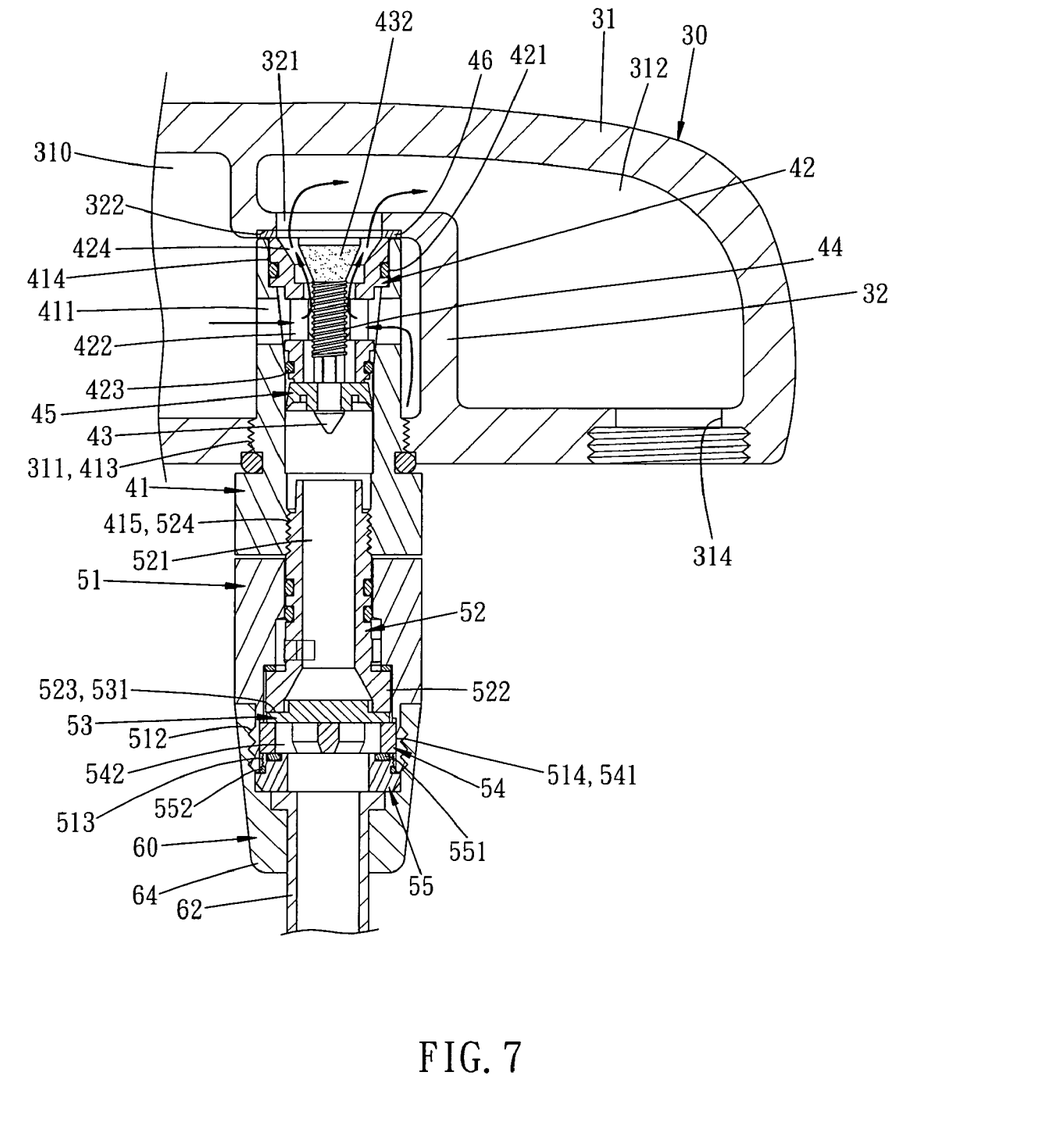
FIG. 7 is a schematic operational view of the faucet as shown in FIG. 5 in use.

Referring to FIG. 7 with reference to FIGS. 1-5, the valve seat 51 of the control valve 50 is reversely rotated by the control handles 511 to rotate the control block 54 to the second position where the openings 532 of the valve block 53 are sealed by a face of the control block 54 to interrupt the connection between the water outlet holes 542 of the control block 54 and the openings 532 of the valve block 53. At this time, the sealing member 432 of the valve shaft 43 is pushed by the restoring force of the elastic member 44 to move upward to open the guide hole 424 of the support seat 42 so as to connect the guide hole 424 of the support seat 42 to the passages 422 of the support seat 42 so that the water from the passages 422 of the support seat 42 can flow through the guide hole 424 of the support seat 42 into the conduit 321 of the baffle 32. Thus, the water from the faucet body 30 in turn flows through the water inlet holes 411 of the sleeve 41, the passages 422 of the support seat 42, the inside of the support seat 42, the gap between the sealing member 432 of the valve shaft 43 and the guide hole 424 of the support seat 42 and the conduit 321 of the baffle 32 into the second water channel 312 of the faucet body 30 and flows outward from the spout 314 of the faucet body 30.

Accordingly, the valve seat 51 of the control valve 50 is rotated to change and control the water outlet modes of the faucet exactly, thereby enhancing the switching function and working efficiency of the faucet. In addition, the faucet body 30 only needs to provide a single screw bore 311 for mounting the switching device 4 without having to provide two screw bores which have to align with each other, thereby facilitating fabrication of the faucet, and thereby decreasing the costs of fabrication. Further, the user only needs to rotate the valve seat 51 of the control valve 50 to change and control the water outlet modes of the faucet, thereby facilitating the user operating the faucet.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A faucet, comprising a faucet body having a water outlet pipe, and a switching device mounted on the water outlet pipe of the faucet body, wherein the water outlet pipe of the faucet body has an inside provided with a baffle to divide the inside of the water outlet pipe into a first water channel and a second water channel, the baffle has a conduit communicating with the first water channel and the second water channel, the first water channel of the faucet body has a screw bore aligned with the conduit of the baffle, and the second water channel of the faucet body has a spout;

the switching device includes a switching valve mounted on the water outlet pipe of the faucet body, and a control valve adjustably mounted on the switching valve and connected to a shower head;

the control valve is operable between a first position where the control valve is opened, so that water from the water outlet pipe of the faucet body flows through the switching valve and the control valve into the shower head and a second position where the control valve is closed, so that the water from the water outlet pipe of the faucet body flows through the switching valve and the conduit of the baffle into the spout;

the switching valve includes a sleeve, a support seat, a valve shaft, a push member, and an elastic member, wherein the sleeve is mounted in the water outlet pine of the faucet body and has a periphery formed with a plurality of water inlet holes communicating with the first water channel of the water outlet pipe;

the support seat is secured in the sleeve and has a periphery formed with a plurality of passages communicating with the water inlet holes of the sleeve, the support seat has an upper end formed with a stepped guide hole communicating with the passages and the conduit of the baffle;

the passages of the support seat are located and connected between the stepped guide hole of the support seat and the water inlet holes of the sleeve;

the valve shaft is movably mounted in the support seat and has an upper end provided with a tapered sealing member that is movable between a first position where the sealing member opens the guide hole of the support seat so that the guide hole of the support seat is connected to the passages of the support seat and a second position where the sealing member seals the guide hole of the support seat to interrupt the connection between the guide hole of the support seat and the passages of the support seat;

the push member is secured to a lower end of the valve shaft to drive the valve shaft to move downward;

the push member is fully hidden in the sleeve;

the elastic member is mounted on the valve shaft and biased between the valve shaft and the support seat to provide a restoring force to the valve shaft to push the sealing member to open the guide hole of the support seat.

2. The faucet in accordance with claim 1, wherein the conduit of the baffle is located above the screw bore of the faucet body and has a periphery formed with a mounting recess for mounting a washer, and the mounting recess of the baffle has a diameter greater than that of the conduit.

3. The faucet in accordance with claim 2, wherein the sleeve has an upper end rested on the washer in the conduit of the baffle, and the upper end of the support seat is rested on the washer in the conduit of the baffle and is flush with the upper end of the sleeve.

4. The faucet in accordance with claim 1, wherein the sleeve has a lower end formed with an outer thread screwed into the screw bore of the faucet body and a flattened rotation portion located under the outer thread and protruded outward from the water outlet pipe of the faucet body.

5. The faucet in accordance with claim 1, wherein the sleeve has an inner wall having an upper portion formed with a stepped groove, and the upper end of the support seat is mounted in and supported by the stepped groove of the sleeve.

6. The faucet in accordance with claim 1, wherein the upper end of the valve shaft has an enlarged head rested on the sealing member.

7. The faucet in accordance with claim 1, wherein the push member is protruded outward from the support seat and movable in the sleeve.

8. The faucet in accordance with claim 5, wherein the support seat has a stepped outer wall provided with two spaced O-rings rested on the inner wall of the sleeve.

9. The faucet in accordance with claim 1, wherein the control valve includes a control shaft, a valve seat, a valve block, and a control block, wherein the control shaft is secured to the sleeve of the switching valve and has an inside formed with a water outlet conduit communicating with the sleeve;

the valve seat is rotatably mounted on the control shaft and rotatable relative to the control shaft;

the valve block is secured to the control shaft and received in the valve seat, the valve block has a periphery formed with two opposite openings each communicating with the water outlet conduit of the control shaft;

the control block is secured in the valve seat to rotate with the valve seat and has an inside formed with two opposite water outlet holes that are movable to align with the openings of the valve block.

10. The faucet in accordance with claim 9, wherein the control block is located under the valve block and is movable relative to the valve block between a first position where the water outlet holes of the control block are connected to the openings of the valve block and a second position where the openings of the valve block are sealed by a face of the control block to interrupt the connection between the water outlet holes of the control block and the openings of the valve block.

11. The faucet in accordance with claim 9, wherein the control shaft has a lower end formed with an enlarged catch portion abutting the valve seat and having a bottom face formed with two opposite protruding locking blocks, and the valve block has a face formed with two opposite locking recesses to lock the locking blocks of the control shaft so that the valve block is secured to the control shaft.

12. The faucet in accordance with claim 9, wherein the sleeve has an inner wall having a lower portion formed with an inner thread, and the control shaft has an upper end formed with an outer thread protruded outward from the valve seat and screwed into the inner thread of the sleeve.

13. The faucet in accordance with claim 9, wherein the valve seat of the control valve has a periphery provided with two opposite protruding control handles to facilitate rotation of the valve seat, and each of the two control handles has a rod shape and protrudes outward from the valve seat of the control valve.

14. The faucet in accordance with claim 9, wherein the valve seat has an inner wall having a lower end formed with two opposite positioning grooves, and the control block of the control valve has a periphery formed with two opposite protruding positioning lips secured in the positioning grooves of the valve seat to secure the control block to the valve seat.

15. The faucet in accordance with claim 9, wherein the valve seat has a lower end having an outer wall formed with a reduced outer thread, and the shower head has a hose having a threaded connector screwed onto the outer thread of the valve seat, so that the valve seat is connected to the shower head by the hose.

16. The faucet in accordance with claim 9, wherein the control valve further includes a tap secured in the valve seat and rested on a bottom of the control block to retain the control block in the valve seat.

17. The faucet in accordance with claim 16, wherein the tap of the control valve has an end face provided with an O-ring rested on the bottom of the control block and a periphery provided with an O-ring rested on an inner wall of the valve seat.

18. The faucet in accordance with claim 16, wherein the valve seat has an inner wall having a lower end formed with an inner thread, and the tap has an outer wall formed with an outer thread screwed into the inner thread of the valve seat.

19. The faucet in accordance with claim 9, wherein the control block is a circular body.

* * * * *